Aug. 25, 1936. C. H. PHELPS 2,052,421
ELECTRICAL TESTING MEANS FOR GASEOUS FLUIDS
Filed April 26, 1934 2 Sheets-Sheet 1

INVENTOR,
Clyde H. Phelps
BY Howard D. Smith
ATTORNEY

Aug. 25, 1936.     C. H. PHELPS     2,052,421
ELECTRICAL TESTING MEANS FOR GASEOUS FLUIDS
Filed April 26, 1934     2 Sheets-Sheet 2

INVENTOR,
Clyde H. Phelps,
BY Howard S. Smith
His ATTORNEY

Patented Aug. 25, 1936

2,052,421

UNITED STATES PATENT OFFICE 2,052,421

ELECTRICAL TESTING MEANS FOR GASEOUS FLUIDS

Clyde H. Phelps, Mount Vernon, N. Y., assignor to The Lantz-Phelps Corporation, Dayton, Ohio, a corporation of Ohio Application April 26, 1934, Serial No. 722,605

4 Claims. (Cl. 73—51)

This invention relates to new and useful improvements in electrical testing means for gaseous fluids.

It is the principal object of my invention to provide electrical means to indicate the nature of internal-combustion, motor-exhaust gases for the purpose of determining a correct fuel mixture for the explosive engines of automobiles and other apparatus.

My electrical indicating means may also be adopted as a safeguard in certain industrial and mine work to detect the presence of carbon-monoxide, carbon dioxide and other poisonous gases.

Other important and incidental objects of my invention will be set forth in the following specification and subjoined claims.

Figure 2:
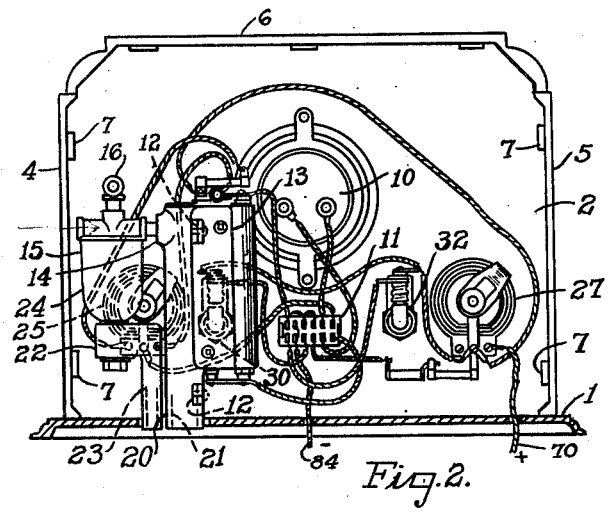
Figure 1:
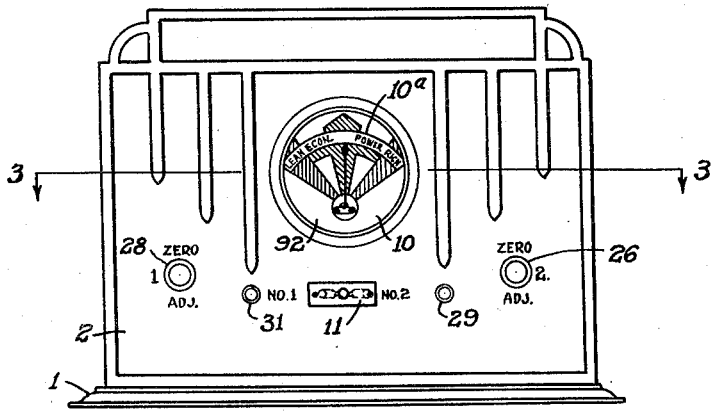
Figure 3:
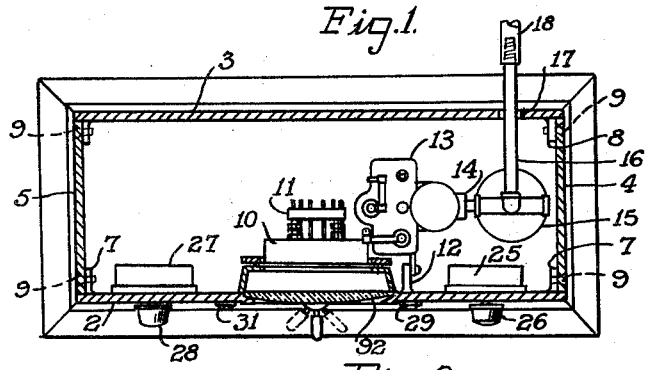
Figure 6:
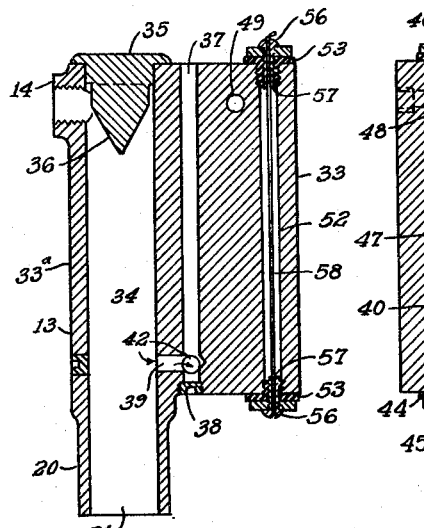
Figure 7:
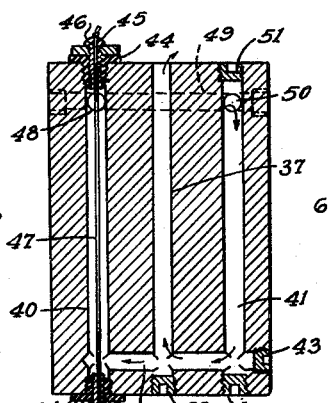
Figure 4:
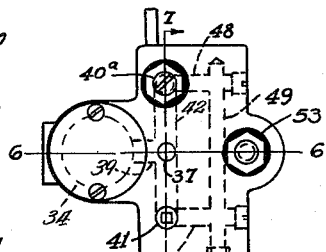
Figure 9:
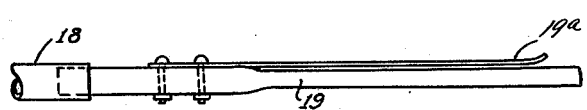
Figure 5:
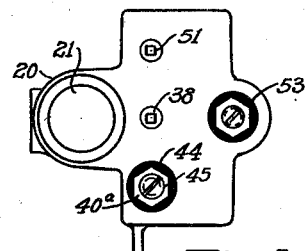
Figure 8:
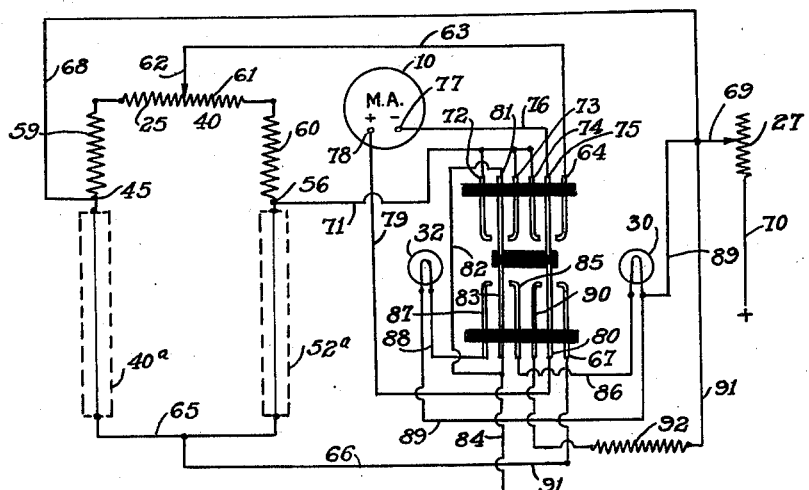

In the accompanying drawings illustrating my invention in its preferred form, Figure 1 is a front view of the electrical testing means. Figure 2 is a rear view of the electrical testing means, with the rear portion of the casing removed. Figure 3 is a sectional view taken on the line 3—3 of Figure 1, showing the placement of the various parts. Figure 4 is a top plan view of the gas cell used with my electrical testing means. Figure 5 is a bottom plan view of this gas cell. Figure 6 is a vertical sectional view taken on the line 6—6 of Figure 4, showing the internal construction of the cell. Figure 7 is also a vertical sectional view taken on the line 7—7 of Figure 4, disclosing the internal construction of the cell. Figure 8 is a circuit diagram of the electrical testing means. And Figure 9 is a detail view of the nozzle device employed in connection with the exhaust gas conveying means.

Referring now to the drawings for a detailed description of the invention, the numeral 1 designates a cast metal, rectangular base having secured adjacent its marginal edges, a front plate 2, rear cover 3, end plates 4 and 5 and a top cover 6. Formed on the inner face of the front plate 2 and rear cover 3, are lugs 7 and 8, respectively, by which the various members are joined by screws 9 to provide a closed casing. (See Figures 1, 2 and 3).

Positioned in an aperture in the front cover 2 is a conventional milammeter 10 whose terminals project within the casing. Likewise secured to the front cover, below the meter 10, is a six pole, double throw switch 11, whose contact blades also project within the casing.

Secured to the rear wall of the front cover 2 by lugs 12, 12, thereon, is a differential cell 13, hereinafter to be more fully described. This cell is provided at its upper end, adjacent the end plate 4, with an inlet boss 14 to which a conventional screened strainer 15 is connected. (See Figures 1 and 3.)

Connected to the top of the strainer 15 is a pipe fitting 16 which projects rearwardly through an aperture 17 in the rear cover 3. To the projecting end of this fitting 16 a flexible tube 18 is secured, and to the other end of the tube is connected a nozzle 19. (See Figure 9.) Secured to this nozzle is one end of an elongated spring 19ᵃ for the purpose of holding it in place at a source of gas to be tested.

By means of the nozzle 19, flexible tube 18, strainer 16 and inlet boss 14, the gases to be tested are conveyed to the differential cell 13. At its lower end this cell 13 has an elongated, depending boss 20 formed with a discharge opening 21 for the gases admitted through the inlet boss 14. (See Figures 1 and 3.)

Attached to the lower end of the strainer 15 is a drain fitting 22 having therein a passage 23 formed to provide a self sealing S trap. As the gases are admitted through the strainer, the condensation therefrom will collect within the strainer bowl 24 for discharge from it through the drain fitting 22 extending below the bottom 1 of the casing. (See Figures 1, 2 and 3.)

Secured to the front plate 2 at one side of the switch 11, is a conventional rheostat 25, whose adjusting knob 26 is positioned on the front plate 2. Likewise secured to the front plate 2, and on the opposite side of the switch 11, is a variable resistance 27, whose adjusting knob 28 is also positioned on the front cover 2.

Between the rheostat 25 and the switch 11, I have provided in the front plate 2 a bullseye lens 29, behind, and against which, there is positioned a small incandescent indicator bulb 30. (See Figures 1, 2 and 3.) Also positioned between the resistance 27 and the switch 11 there is another bullseye lens 31 and behind, and against which, there is positioned a small incandescent indicator bulb 32.

The differential cell 13 will now be described. As shown in Figures 4 to 7 inclusive, this cell comprises an elongated body 33, preferably of cast aluminum and having integral with one side a semi-circular extension 33ᵃ, formed with a large vertical passage 34. The upper end of this passage is closed by a cap 35 which terminates on its underside in a conical point 36 that extends below the inlet boss 14 formed on the side of the extension 33ᵃ adjacent its upper end. Hot gases entering the passage 34 through the inlet 14 impact the cone 36, by which they are condensed to prevent moisture entering the cell 13. The condensate drops straight out of the cell through its discharge opening 21. Below the body 33, the extension 33ª is cylindrical in cross section, providing in its lower end the outlet 21 previously referred to. (See Figures 4, 5 and 6.)

Adjacent the passage 34, and extending vertically through the body 33 of the cell, is a center passage 37 of restricted size, whose top end is open to the atmosphere but whose lower end is effectively closed by a threaded plug 38. Communicating with the lower end of the passage 37 is another passage 39 at right angles to it and connected with the passage 34.

Positioned on one side of the passage 37, and likewise extending vertically through the cell body 33, is a passage 40. On the opposite side of this central passage 37 there is another passage 41 parallel with it. (See Figures 4, 5 and 7.)

At their lower ends the passages 37, 40 and 41 are inter-connected by a lateral port 42 in alinement with the passage 39 and whose outer end is closed by a threaded plug 43. The upper and lower ends of the passage 40 are threaded to receive in each a flanged plug 44 of insulating material such as fiber. Inserted in each plug 44 is a machine screw 45 having a small axial hole 46. Positioned in the center of the opening 40, and extending through the axial hole 46 in each screw 45 is a resistor wire 47. The latter is preferably a manganin wire whose ends are soldered to the screws 45, 45 at the ends of the passage and by which the wire is maintained taut to form a thermo-electric resistor unit 40ª. (See Figures 4, 5 and 7.)

Communicating with the passage 40 below the top plug 44, is a lateral passage 48 that intersects another transverse passage 49. This passage 49, at its opposite end, is also connected with the upper end of the passage 41 by another lateral passage 50. The upper and lower ends of the passage 41 are closed by threaded plugs 51, 51.

Now, when the wire 47 is heated by the passage of electric current through it in a manner hereinafter to be described, the rising column of heated air surrounding it, will draw the gases to be tested into the passage 40 from the passage 39, port 42 and the large vertical passage 34 in which those gases are received. When the rising column of gases reaches the lateral passage 48, they will flow through the transverse passage 49 and port 50 into the passage 41, through which they will descend in a cooled state, their latent heat being absorbed by the surrounding metal walls, for discharge into the atmosphere through the central passage 37. (See Figures 6 and 7.) Some of the gas entering the port 42 through the passage 39 may pass directly up the central passage 37 to the atmosphere, and a portion of the gas coming from the passage 41 may again pass through the passage 40, but this will have no effect upon the results obtained, because the chemical structure of the freshly admitted gas and the gas which again makes the circuit is the same.

At the rear of the central passage 37, I have provided another vertical passage 52, in whose threaded upper and lower ends there is a flanged plug 53 similar to the plug 44. Fitted in each plug 53 is a machine screw 56 formed with a small axial passage 57. Positioned in the center of the passage 52 is a resistor wire 58 of manganin or similar metal whose ends pass through the apertures in the screws 56 and to which the wire ends are soldered. As shown in Figures 4, 5 and 6, the resistor 58 is surrounded by entrapped still air, since there are no openings communicating with the passage 52, which forms another thermo-electric cell 52ª.

The functions of the thermo-electric cells 40ª and 52ª will now be described in connection with the devices shown in Figures 1, 2 and 3, and with particular reference to the circuit diagram shown in Figure 8. Connected to the top terminal screw 45 of the thermo-electric cell 40ª is a fixed resistance 59. To the top terminal screw 56 of the thermo-electric cell 52ª there is connected another fixed resistance 60 of the same value as the resistance 59.

Interconnected between the opposite ends of these resistors 59 and 60 are the ends of another resistance 61 of the rheostat 25, and which a variable contact arm 62 engages. Connected to the arm 62 is a lead 63 whose other end is secured to a contact blade 64 on the switch 11.

At their lower ends the thermo-electric cells 40ª and 52ª are joined by a shunt 65 whose mean point is connected by a lead 66 with another contact blade 67 of the switch 11. Connected with the resistance 59 and the cell 40ª at their junction is a conductor 68 whose opposite end is secured to the variable contact arm 69 of the resistance 27, that is actuated by the knob 28 on the panel 2. From one end of the resistance 27 a lead 70 runs to the positive terminal of a low voltage, direct current source such as a dry battery (not shown).

Connected with the resistance 60 and the cell 52ª at their juncture is another conductor 71 whose opposite end is connected with shunted contacts 72, 73 and 74 of the switch 11. Intermediate the contacts 64 and 74 the movable blade contact 75 of the switch 11 is connected by a lead wire 76 to the negative terminal 77 of the milammeter 10. From the positive terminal 78 of the latter a lead wire 79 passes to another movable blade contact 80 adjacent the contact 67. Between the contacts 72 and 73 of the switch 11 is another movable blade contact 81 connected by a wire 82 with another movable blade contact 83, and by a conductor 84 with the negative terminal of the low voltage, direct current source above referred to.

Adjacent the blade contact 83 there is a contact 85 that is connected by a wire 86 with one terminal of the bulb 30, and on the opposite side of the blade contact 83 there is another contact 87 which is connected by a wire 88 with one terminal of the bulb 32. The other terminals of the bulbs 30 and 32 are connected by a common lead 89 with the contact arm 69 of the variable resistance 27 and the positive side of the circuit.

Provided on the switch 11 between the movable blade 80 and the contact 85 is another contact 90 having secured thereto a lead 91 that is also connected with the contact arm 69 of the variable resistance 27. In series with the lead 91 is a resistor unit 92 of high resistance, approximately 600 ohms.

The function of the circuits are as follows. The gas thermo-electric cell 40ª and the air thermo-electric cell 52ª, with the fixed resistors 59 and 60, form the four arms of a conventional Wheatstone bridge, which is common in the measurement of unknown electrical resistances.

When the switch 11 is moved to the left as viewed in Figure 8, the movable blade contacts 75, 80, 81 and 83 will contact the stationary contacts 74, 90, 72 and 87 respectively. Current will now flow from the low voltage, direct current source, through the variable resistance 27, arm 69 and lead 68 to the terminal screw 45. At this point the current will divide to flow in equal amounts through the resistors 59, 61 and 60, and through the thermo-electric cells 40ᵃ and 52ᵃ to the terminal 56.

From the terminal 56 the current will flow through the lead 71 to the contacts 72, 73 and 74. From the contact 72, the current will pass through the movable blade contact 81, and the leads 82 and 84 to the negative pole of the low voltage direct current source. Voltage will also be impressed on the milammeter 10, through the movable blade 75 now contacting the contact 74. Also from the contact arm 69 current will flow through the lead 91, resistor 92, contact 90, movable blade 80 and the lead 79 to the other terminal of the meter 10.

With the switch 11 in this position, it is evident that the meter 10, with the high resistance 92 in series with it, is shunted across the terminals 45 and 56 to function as a volt meter for the purpose of registering thereon the voltage impressed upon them by the low voltage direct current source. Now, as the variable contact arm 69 is adjusted on the resistance 27, the desired voltage, as indicated by the meter, may be secured. Also, with the switch in this position the movable blade 83 will contact the contact 87, and the indicator bulb will be illuminated to indicate the adjustment being effected.

When the switch 11 is moved to the right, as viewed in Figure 8, the movable blade contacts 75, 80, 81 and 83 will contact the stationary contacts 64, 67, 73 and 85 respectively. The current, at the adjusted voltage, will now flow from the low-voltage, direct current source through the variable resistance 27, arm 69 and lead 68 to the terminal screw 45. At this point the current will divide, to flow in equal amounts through the resistors 59, 51 and 60, and through the thermo-electric cells 40ᵃ and 52ᵃ to the terminal 56. From the terminal 56 the current will flow through the lead 71 to the contact 73 and the movable blade 81, and thence to the negative pole of the low voltage direct current source through the leads 82 and 84.

Current will also flow from the contact arm 62 of the rheostat 25, through the lead 63, contact 64, movable blade 75 and lead 76 to the negative terminal 77 of the milammeter 10. The opposite terminal 78 of this milammeter will also be connected through the lead 79, movable blade 80, contact 67 and lead 66 to the mean point of the shunt 65, connected between the lower ends of the thermo-electric cells 40ᵃ and 52ᵃ. With the switch 11 in this position, the rheostat arm 62 is adjusted to bring the milammeter needle to a desired center position on its scale, such an adjustment being effected by varying the balance of the resistance included in each circuit between the contact arm 62 and the mean point of the shunt 65.

The heated resistor wire 58 within the thermo-electric cell 52ᵃ, as previously described, is suspended within the opening 52. Closed against the entrance of air, it will have a uniform electrical resistance, because of its uniform radiation of heat to the surrounding metal wall through an unchanging air column.

The heated resistor wire 47, within the thermo-electric cell 40a is, however, subject to the presence of the gas to be tested. As the carbon and unburned fuel content of this gas increases, its thermal conductivity will also increase and produce a more rapid cooling of the wire 47. This will lower the resistance of the wire and disturb the electric balance. When the resistance of the wire 47 is thus lowered, current will flow through the lead 66 and 79 to the meter to cause its indicator to swing toward the right.

If the carbon and unburned fuel content of the gas present decreases, its thermal conductivity becomes less, and as a result, the temperature of the wire 47 will increase and produce a higher resistance to the passage of electricity through it. Since the meter indicator hand is primarily adjusted for a normal condition, such increased resistance of the wire 47 will cause the electrical balance to be disturbed. The current will then flow through the relatively lower resistances 59 and 61, and through the leads 63 and 76, to the meter, in this case to cause its indicator to swing to the left.

In Figures 1 and 3 I have shown an indicator dial 10ᵃ positioned behind a magnifying lens 92. The indicator dial 10ᵃ as shown in Figure 1 has the center portion of its scale, to the right of its vertical center line, calibrated and marked "Power" and the extreme right end of the scale calibrated and marked "Rich". To the left of its vertical center line the center portion of the scale is calibrated and marked "Economy", while the extreme left end of the scale is marked "Lean".

Now, as previously described, the switch 11 is first moved to the left or to the No. 1 position as indicated in Figure 1. Voltage impressed on the terminals 45 and 56 is then adjusted by the variable resistance 27 to its desired value, as indicated by the meter indicator, said meter being shunted across the above terminals with the high resistance 92 in series with it.

When the switch 11 is moved to the right, current will flow through the leads 68 and 71 to the terminals 45 and 56 and the thermo-electric resistor wires 47 and 58 will be heated. By adjusting the rheostat arm 62, the indicator needle will be brought to the central position as shown in Figure 1.

If it is now desired to test the efficiency of an internal combustion engine, the nozzle 19 is inserted in the exhaust outlet. The exhaust fumes will be conveyed to the cell 40ᵃ in the manner previously described, to surround the heated wire 47. If the gas thus admitted is high in carbon or unburned fuel, then its thermal conductivity will be high and the heat from the wire 47 will be dissipated at a higher rate to cause the electrical resistance of the wire to decrease. Such decreased resistance will cause the indicator to swing to the right to indicate the relative richness of the carburetor mixture.

If the reverse condition were true, and the exhaust gases very low in carbon or unburned fuel, then the thermal conductivity would be decreased, resulting in a lowered radiation of heat from the heated wire 47. Its electrical resistance will then rise, and as previously described, the meter indicator will move to the left to indicate a lean fuel mixture. If the effected movement of the needle is slight, and within the center shaded portion of the dial, the carburetor adjustment is satisfactory.

While I have particularly described the operation of my electrical testing device in connection with the testing of internal combustion engines, it is equally adaptable to test various gases such as are encountered in industrial and mining operations, to determine their lethal properties and safeguard human life.

Having described my invention, I claim:

1. A gas activated thermo-electric cell comprising an elongated metal body having a large, elongated, vertical gas receiving chamber open at its lower end to the atmosphere and having a lateral gas inlet port at its upper end, said body having two parallel longitudinally extending passages adjacent said chamber, one of said passages being in communication with the gas receiving chamber to receive therefrom gas to be tested, and a heated resistor in each passage for connection to a current-indicating means, said body having a third passage communicating with the gas-receiving chamber, the second passage and the atmosphere.

2. In a gas-receiving chamber open at one end and having a gas inlet port at its other end, and gas-condensing means in said chamber opposite said inlet port, whereby the condensate thereon is free to drop through the open end of the chamber.

3. In a gas-receiving chamber open at its lower end and having a lateral gas inlet port at its upper end, and a conical member depending from the upper end of said chamber opposite said inlet port, to condense the gas entering the chamber through said port, whereby the condensate thereon is free to drop through the open lower end of said chamber.

4. In a gas-activated thermo-electric cell, comprising a metal body formed with a vertical gas admission passage and chambers communicating therewith, the vertical gas admission passage being open at its lower end and having a lateral gas inlet port at its upper end, and a conical member closing the top of said passage and having its conical portion opposite said inlet port to condense the gas entering said passage through said port and thereby preventing the entrance of moisture to the communicating chambers of the cell, whereby the condensate thereon is free to drop from the conical member through the open lower end of said vertical passage.

CLYDE H. PHELPS.